Nov. 22, 1949     I. N. HEWITT     2,489,088
LEVER OPERATED TIRE LOOSENING DEVICE
Filed Oct. 13, 1945
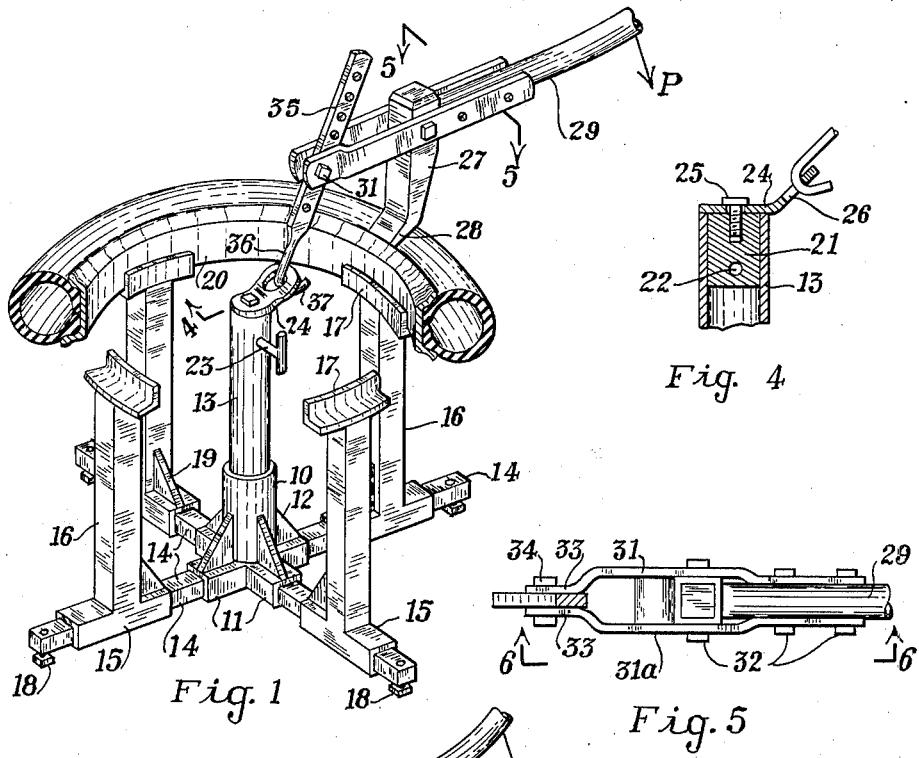
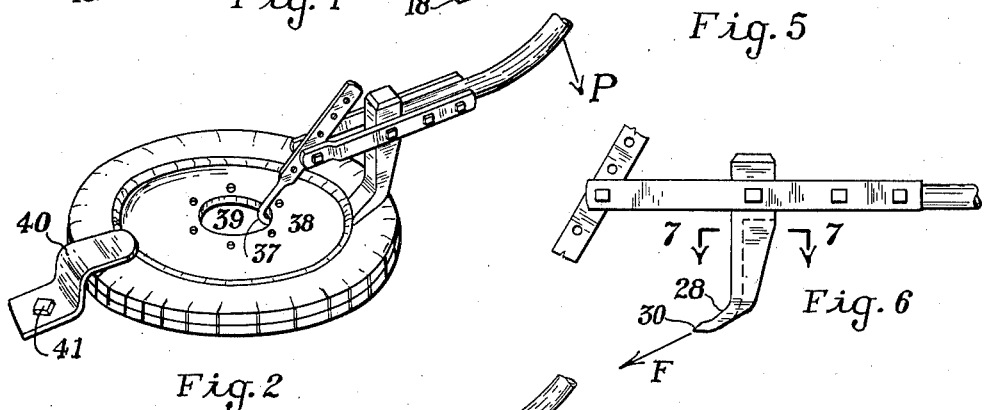
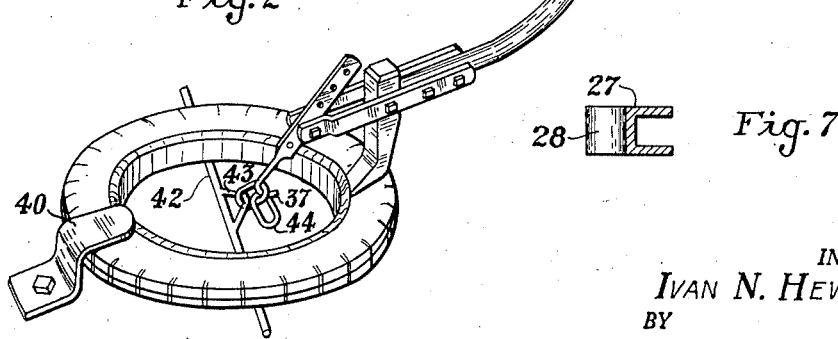
INVENTOR.
IVAN N. HEWITT
BY
Martin E. Anderson
ATTORNEY Patented Nov. 22, 1949

2,489,088

UNITED STATES PATENT OFFICE 2,489,088

LEVER OPERATED TIRE LOOSENING DEVICE

Ivan N. Hewitt, Medicine Lodge, Kans.

Application October 13, 1945, Serial No. 622,152

2 Claims. (Cl. 157—1.17)

This invention relates to improvements in tire tools and has reference more particularly to a hand operated tool for loosening tire casings from rims.

Tire casings that are used in connection with trucks and other automobiles exposed to the weather, frequently become "rusted fast" to the rims to such an extent that they are very difficult to loosen for removal and this is more particularly true with truck tires that are very stiff and heavy.

It is the object of this invention to produce a simple, substantial and effective tire tool that can be employed with either rims or with removable wheels and which shall be of such construction that great force can be exerted thereby for loosening tires from the rims.

Another object of this invention is to produce a tire removing tool of such a construction that a hammer can be used in addition to the ordinary pressure for the purpose of loosening the tire casings by impact blows wherever they cannot be otherwise conveniently loosened.

A further object of the invention is to produce a tire removing tool that can be used in combination with a supporting base like that shown in my copending application Serial No. 596,043, filed May 26, 1945, issued December 7, 1948, as Patent No. 2,455,580.

A further object of the invention is to produce a manually operated tire tool in which the pressure exerting member is formed in the shape of a curved wedge of such construction that when force is applied, it tends to move inwardly between the flange of the tire rim and the tire casing.

The above and other objects that may become apparent as the description proceeds are attained by means of a construction and an arrangement of parts that will now be described in detail, and for this purpose reference will be had to the accompanying drawing in which the invention has been illustrated in its preferred form, and in which:

Figure 1 is a perspective view of a supporting base and shows a section of a rim and tire casing supported thereby and also shows the tire removing tool in operative position relative thereto;

Figure 2 is a perspective view showing the tire tool employed in connection with a removable wheel;

Figure 3 is a perspective view similar to that shown in Figure 2, but showing the tool employed in connection with a tire casing and rim supported on the floor;

Figure 4 is a section taken on line 4, Figure 1;

Figure 5 is a top plan view looking downwardly in the direction of arrows 5—5, Figure 1, one portion being shown in section;

Figure 6 is a side elevation of the tool shown in Figure 5; and

Figure 7 is a cross section taken on line 7—7, Figure 6.

In the drawing reference numeral 10 designates cylindrical hub forming part of the tire rim supporting frame. This hub has short spokes 11 extending radially therefrom and connected therewith by means of gusset stays 12. A tubular cylindrical member 13 extends upwardly from the hub. Rectangular spokes 14 extend radially from the hub and have their inner ends inserted into the short spokes 11. Slidably connected with the spokes 14 are tubular members 15 from which rectangular bars 16 extend upwardly, terminating in short arcuate supports 17. Bolts 18 are adjustably connected with the ends of the spokes so as to effect adjustment with any uneven supporting surface. Gusset plates 19 are provided for strength.

Supported on the frame that has just been described is a tire rim 20. This may be of any usual make, either of the cross section shown in the drawing or of the drop center type or of the type having a removable attaching ring which is frequently employed in connection with heavy truck tires. Secured in the upper end of tubular member 13 is a cylindrical plug 21 that is provided with an opening 22 for the reception of a fastening pin 23. Secured to the upper end of plug 21 is a flat link 24 that is held in place by means of the cap screw 25. Link 24 is provided with an opening 26 for a purpose which will hereinafter appear.

The tire tool that forms the subject of this invention consists of a wedge-shaped member 27 that has its lower end curved to one side as indicated by reference numeral 28. A handle 29 is welded to the convex side of the wedge near the large upper end thereof. The wedge has a U-shaped cross section somewhat as shown in Figure 7 so as to reduce the amount of material employed in its construction. The lower end of the wedge is shaped as shown in Figure 6, terminating in an inclined surface 30. Attached to the handle and the wedge are two steel bars 31 and 31a. These may be welded in position or secured to the wedge and to the handle by means of bolts 32. The ends of the bars are bent inwardly terminating in flat end portions 33 that are perforated for the reception of a bolt 23. A link having a flattened portion 35 and a round portion 36 that terminates in a hook 37, has its flat portion positioned between the flat ends 33 and pivotally connected with the bars by means of pivot bolt 34. Hook 37 is inserted into opening 26 as shown in Figures 1 and 4 after which the tip of the wedge is positioned in the groove between the rim flange and the tire casing. Pressure can now be exerted on the handle tending to move the same in the direction of arrow P in Figure 1. The leverage obtained by the construction shown multiplies the force exerted and the relationship of the parts is such that the resultant force is directed inwardly and downwardly in the direction of arrow F in Figure 6. This force resultant tends to force the wedge in between the rim flange and the casing and is usually effective to loosen the tire casing from the rim. In case the casing is "rusted fast" the operator can employ a heavy hammer or sledge to strike the upper end of the wedge, thereby adding to the force P an impact force that is highly effective for the purpose of loosening the tire. After one section of the tire has been loosened, the tool is moved angularly to another position and in this way the entire 360 degrees can be loosened. The flat portion 35 is provided with a plurality of openings for adjusting the tool to different sized tires and tire rims and also for the purpose of controlling the direction of the resultant force F. Link 24 is secured to plug 21 in such a way that it can turn about bolt 25 as a pivot. In Figure 2, the tool has been shown applied to a removable wheel of the type having an integral rim. The flange part of the wheel has been designated by reference numeral 28 and this is provided with an opening 39. Hook 37 engages the wall of the opening as shown. In the drawing a hook 40 has been shown as secured to the floor by means of a bolt 41. This is convenient where there is merely a single operator, as hook 40 prevents the wheel from tilting when force is applied to the handle. Where such a hook is not used, it is necessary for the operator to hold the tire down with one foot or have some one standing on the tire to prevent it from tilting.

In Figure 3, the tire tool has been shown as connected with the removable rim that rests on the floor, since such rims have no convenient place to anchor the hook 37 a straight bar 42 has been provided for this purpose. This bar is positioned underneath the tire casing and rim and has one side provided with a loop 43 and several links 44. Hook 37 is engaged in one of the links and the tool adjusted with respect to the tire and rim as shown. Hook 40 may be provided, if desired, or some other equivalent means used to keep the tire and rim from tilting.

Particular attention is directed to the construction of this tool in which the upper end of the wedge is accessible and conveniently located for the reception of hammer blows. It is well known that impulse forces are more effective for loosening a tire casing than a steady pressure, and by means of this construction, the impulse forces can be effectively applied to any part of the tire and rim desired.

Attention is again directed to the arrangement of links and pivots shown in Figure 1 and also in Figures 2 and 3. This linkage results in a downward and inward force which produces a resultant incline somewhat as indicated by arrow F in Figure 6.

Attention is directed in particular to the fact that wedge member 27 is rigidly connected with the handle 29. It is evident that if wedge 27 were pivoted for rocking movement about an axis parallel to pivot 31, it would produce an unstable structure very difficult to apply and to use, as handle 29 could then move longitudinally. By the rigid construction shown, handle 29 and wedge 27 can be used to pry a tire loose in a manner not possible if 27 were pivoted to the handle.

Having described the invention, what is claimed as new is:

1. A tool for loosening a vehicle tire from a rim, comprising, a forwardly curved wedge having an integral rectangular upstanding shank, a pair of parallel arms rigidly secured to the shank near its upper end, one on each side thereof and extending transversely thereto both forwardly and rearwardly, a handle fixedly secured to the rearwardly extending portions of the arms therebetween and to the shank, whereby the arms, shank, and handle, are fixedly secured together, a link disposed between the arms at the forward ends thereof and having a hook at its lower end, the link having a plurality of holes therein to vary the distance of the hook from the arms, and means extending through one of the holes and the arms pivotally securing the link thereto, the upper end of the shank extending above the arms and having a sufficient area at its top to receive an impact from a hammer or the like.

2. A tool in accordance with claim 1 wherein the shank is U-shaped in cross section between the wedge and parallel arms.

IVAN N. HEWITT.

REFERENCES CITED

The following references are of record in the file of this patent:

UNITED STATES PATENTS

| Number | Name | Date |
|---|---|---|
| 1,199,344 | Campbell | Sept. 26, 1916 |
| 2,148,111 | Dennis | Feb. 21, 1939 |
| 2,241,886 | Pearce | May 13, 1941 |
| 2,294,271 | Bethard | Aug. 21, 1942 |
| 2,391,626 | Howard | Dec. 25, 1945 |
| 2,399,146 | Schumann | Apr. 23, 1946 |

FOREIGN PATENTS

| Number | Country | Date |
|---|---|---|
| 817,844 | France | Sept. 11, 1937 |